(12) United States Patent
Petrov et al.

(10) Patent No.: US 7,728,848 B2
(45) Date of Patent: Jun. 1, 2010

(54) TOOLS FOR 3D MESH AND TEXTURE MANIPULATION

(75) Inventors: Michael Petrov, Princeton, NJ (US); Alexander Migdal, Princeton, NJ (US); Alexei Lebedev, New York, NY (US); Veronika Shelyekhova, Nutley, NJ (US); Leonid Polonskiy, Hamilton, NJ (US); Vadim Abadjev, Princeton, NJ (US)

(73) Assignee: DG FastChannel, Inc., New York, NY (US)

(*) Notice: Subject to any disclaimer, the term of this patent is extended or adjusted under 35 U.S.C. 154(b) by 1296 days.

(21) Appl. No.: 09/819,772

(22) Filed: Mar. 28, 2001

(65) Prior Publication Data

US 2001/0056308 A1 Dec. 27, 2001

Related U.S. Application Data

(60) Provisional application No. 60/192,506, filed on Mar. 28, 2000.

(51) Int. Cl.
*G09G 5/00* (2006.01)
(52) U.S. Cl. ..................................... 345/619
(58) Field of Classification Search ................ 345/619, 345/964; 700/182; 706/919
See application file for complete search history.

(56) References Cited

U.S. PATENT DOCUMENTS 5,850,223 A * 12/1998 Fujita et al. ................. 345/420
5,995,107 A 11/1999 Berteig et al.
6,034,695 A 3/2000 Silva et al.
6,219,055 B1 4/2001 Bhargava et al.
6,271,856 B1 8/2001 Krishnamurthy
6,420,698 B1 * 7/2002 Dimsdale .................... 250/234

OTHER PUBLICATIONS

Jay Zirbel & Steven Combs, Using AutoCAD, 1995, QUE, Special Edition, p. 1011-1016.*
Kermit Sigmon, MATLAB Primer, 1993, Department of Mathematics —University of Florida, Third Edition [online], [Retrieved on Mar. 28, 2007]. Retrieved from the Internet<URL:http://www.rpi.edu/~roytbv/numcomp/sigmon.pdf>.*
Kermit Sigmon, MATLAB Primer, 1993, Department of Mathematics—University of Florida, Third Edition [online], [Retrieved on Mar. 28, 2007]. Retrieved from the Internet.*
"Amorphium Real Time 3D Sculpting and Painting", Quick Try Guide, Copyright 1999.
3D Studio Max, "At a Glance", 4 pages.

* cited by examiner

*Primary Examiner*—Matthew C Bella
*Assistant Examiner*—Gregory F Cunningham
(74) *Attorney, Agent, or Firm*—Kenyon & Kenyon LLP

(57) ABSTRACT

Improvement of the performance, usability, and functionality of software for editing three dimensional computer models and textures is described. Editing operations are performed on the model in an ordered list to reduce the amount of memory required to maintain previous versions, and certain editing operations are precalculated to reduce the amount of real time calculation required. Improvements to usability and functionality are provided by more precisely selecting portions of a model for editing, allowing textures to be moved more easily on the model, and allowing better blending of the appearance of adjacent textures.

22 Claims, 8 Drawing Sheets

TOOLS FOR 3D MESH AND TEXTURE MANIPULATION

This application claims the benefit of U.S. Provisional Application No. 60/192,506, entitled "System and Method of Three Dimensional Image Capture and Modeling", filed Mar. 28, 2000.

FIELD OF THE INVENTION

The present invention is directed to tools for editing three dimensional ("3D") mesh models and textures on a computer.

BACKGROUND OF THE INVENTION

There is increasing interest in the use of three-dimensional models of physical objects to improve productivity and innovation in fields such as digital imaging, computer animation, special effects in film, prototype imaging in product development, topography, reconstructive and plastic surgery, dentistry, architecture, industrial design, anthropology, milling and object production, biology, and internal medicine. In addition, with the recent explosion of the Internet and the World Wide Web, there is a demand for computer-generated 3D models for use on Web sites. Although 2D images currently predominate in the display and manipulation of graphic images on the World Wide Web, the use of 3D object models is a more efficient way to present graphic information for interactive graphics, animated special effects and other applications. The use of 3D models is growing in Web-based and other applications and continued growth is expected as personal computer systems become more powerful and bandwidth limitations are eliminated.

There are a number of ways of creating 3D models. Creating the model directly from the physical object itself is probably the most accurate and time efficient method. This can be accomplished in a number of ways. For example, a 3D model can be created using silhouette capture, as described in copending application entitled "System and Method of Three-Dimensional Image Capture and Modeling" filed concurrently with this application and assigned U.S. application Ser. No. 09/819,499, the whole of which is incorporated herein by reference. Laser scanning techniques may also be used to create 3D models from real-world objects. Alternatively, the 3D model may be constructed "by hand" on a computer by an artist who draws the model directly by placing vertices or faces or by combining smaller geometric shapes to form the overall model.

A 3D model is typically constructed using 3D spatial data and color or other data (called "texture data") that is associated with specific areas of the model (such texture data is used to render displays or images of those portions of the model). Spatial data includes 3D X, Y, Z coordinates that describe the physical dimensions, contours and features of the object being modeled. This 3D point data usually defines a "wire-frame" model that describes the surface of the object being modeled and represents it as a series of interconnected planar shapes (sometimes called "geometric primitives" or "faces"), such as a mesh of triangles, quadrangles or more complex polygons. These wire frame models can be either gridded mesh models or irregular mesh models.

Gridded mesh models superimpose a grid structure as the basic framework for the model surface. The computer connects the grid points to form even-sized geometric shapes that fit within the overall grid structure. While gridded models provide regular, predictable structures, they are not well-suited for mesh constructions based on an irregular set of data points, such as those generated through laser scanning or silhouette capture of real world objects. The need to interpolate an irregular set of data points into a regular grid structure increases computation time and decreases the overall accuracy of the model. Gridded mesh models are more typically used when the model is constructed by hand.

More frequently, 3D models created from real-world objects use an irregular mesh model, such as an irregular triangulated mesh, to represent the real-world object more accurately. An irregular mesh model imposes no grid structure upon the model. Instead, the actual 3D X, Y, Z data points are used directly as the vertices in each planar shape or "face" of the mesh.

In addition to using spatial data, 3D object modeling systems also include texture data as a part of the object model. Texture data is color and pattern information that replicates an object's surface features. Some 3D object modeling systems maintain texture data separately from the "wire-frame" mesh data and apply the texture data to the mesh only when rendering the surface features. Those object modeling systems typically include two distinct and separate processes: first, in a mesh building phase, the system constructs a "wire frame" mesh to represent the object's spatial structure using only 3D X, Y, Z values (and other related spatial information) and, second, during a "texture map" building phase, the system assigns texture data to each of the faces of the mesh model, so that when the model is later rendered, the displaying device can overlay texture data on the geometric faces of the model. The rough face of a brick, the smooth and reflective surface of a mirror and the details of a product label can all be overlaid onto a mesh wire frame model using texture mapping techniques.

For models of real-world objects, texture data typically comes from 2D photographic images. The 3D spatial coordinate values of a mesh model face can be related and linked to specific points (i.e. two-dimensional x, y pixel locations) in the digitized versions of the collected photo images. Commercially available digital cameras output image frames, each of which includes a 2D matrix of pixels (e.g. 640×480 pixels in dimension), with each pixel having, for example, a three-byte (24 bit) red, green and blue (R, G, B) color assignment. Such a 3D object modeling system will then store each such photographic image as a "bitmap" (such as in TIFF format). The 3D object modeling system will link each mesh face in the generated 3D mesh model to a specific area in a selected bitmap that contains the appropriate texture data. When showing a view of the 3D model, a displaying device then clips relevant areas of the appropriate bitmap and overlays the clip on the associated mesh face.

Regardless of how the model is created, at least some manual adjustment of the model is usually necessary to attain the desired finished appearance. In the case of a model created by hand, the entire creation process is one of manual placement and adjustment of vertices, faces, and textures. Many users have difficulty making these adjustments because they require manipulating a three dimensional object (i.e. the mesh model) in what is essentially a two dimensional space (i.e. the computer screen) using tools that generally move in only two dimensions (i.e. the mouse and cursor keys). Other difficulties arise from the fact that mesh manipulation is limited to manipulating entire faces or vertices. For example, when a user wishes to change the appearance of a large flat area on the mesh that has only a few faces, additional faces and vertices must be added if any significant change is desired. Adding vertices and faces can be very difficult if it has to be done manually, especially for a novice user. Even those users who are proficient at these kinds of manipulation likely experienced a significant learning curve before becoming proficient. It would be useful to allow users more precision in manipulating mesh models as well as increasing ease of use.

Furthermore, most users find it useful to be able to manipulate the mesh in real time rather than make an adjustment to the model and then wait while the computer system renders the model. However, real time 3D rendering requires that the computer system perform a tremendous number of calculations in a short period of time. Users also frequently make changes to a mesh model, discard those changes as unwanted, and revert back to a prior version. This functionality is generally implemented by what is known as an "undo" operation. Implementing this operation usually requires that a copy of every previous version of the mesh model to be kept in memory. If the mesh model is of any significant size, the memory limitations of the computer may become taxed relatively quickly. It would be useful to be able to reduce the amount of real time calculations and memory requirements necessary to perform the 3D mesh manipulation.

SUMMARY OF THE INVENTION

The present invention provides techniques that may be used individually or in combination to allow more efficient and intuitive manipulation and adjustment of 3D meshes as well as reduce the memory requirements and the amount of rendering calculations that must be performed in real time.

One embodiment of the present invention provides an accurate translation of a freeform screen selection into a selection of faces and vertices on the mesh. Any new vertices and faces that are necessary to allow the selection on the mesh to accurately reflect the user's desired selection are calculated automatically without requiring painstaking manual additions by the user. The present invention accomplishes this by approximating the screen selection as a polygonal shape, projecting the 3D mesh onto the polygonal shape as a 2D triangulated mesh, adding new vertices and edges to those triangles bisected by the polygonal shape, and retriangulating the intersected triangles to form the necessary new faces.

The present invention also provides for selecting and manipulating portions of the 3D mesh so that the edges of the selected/manipulated portion blend into the unaltered area of the 3D mesh. This is accomplished by applying a strength function across the selected area so that the strength of the operation to be performed on the selected area is greatest in the center and gradually diminishes to negligible at the edges of the selection.

Another embodiment of the present invention allows adjustments to the way in which textures are mapped onto the 3D mesh. When a coordinate of a texture is selected and dragged to a new location, the other coordinates in the texture are smoothly transformed to accommodate the move based on the distance the selected coordinate was moved, the distance the present coordinate was from the selected coordinate, and a weight function. This transformation is accomplished in 2D space rather than 3D space, thus reducing the amount of calculation required and making it possible for the user to see the results of the transformation as the selected coordinate is being dragged.

The present invention also includes an embodiment that allows abutting textures to be blended together for a more natural appearance on the rendered mesh. Pairs of matching points along the abutting edges of the textures are identified, the textures are stretched and/or compressed to spatially align the pairs of matching points, and the image properties of the textures are adjusted to more closely match the appearance of the adjacent texture.

The present invention also includes embodiments that reduce the amount of real time calculations that must be performed in implementing the other embodiments. When an editing operation is anticipated, the present invention applies the editing operation to the mesh at successively greater strengths and stores the results of each application. When the editing operation is to be performed on all or part of the original mesh at a particular strength, the stored mesh (or part thereof) at the corresponding strength is substituted for the appropriate portion of the original mesh.

The present invention further includes embodiments that provide for storing the mesh in memory by storing an initial mesh with an ordered list of all operations performed on the mesh. This allows reversion to previous versions of the mesh to be accomplished more easily without requiring that an individual copy of the mesh be stored after each operation is performed on it.

All of these embodiments and some possible combinations thereof are described in detail below.

DETAILED DESCRIPTION

The present invention can be used in 3D modeling software on a variety of computing hardware such as personal computers based around Intel, AMD, Motorola, or Transmeta processors, or workstations such as those built by IBM or SGI, running any of a variety of operating systems such as Microsoft Windows, MacOS, Unix, Linux, or OS/2. The software implementing the methods of the present invention can be developed in any suitable programming language, such as C, C++, or Java.

Figure 1:
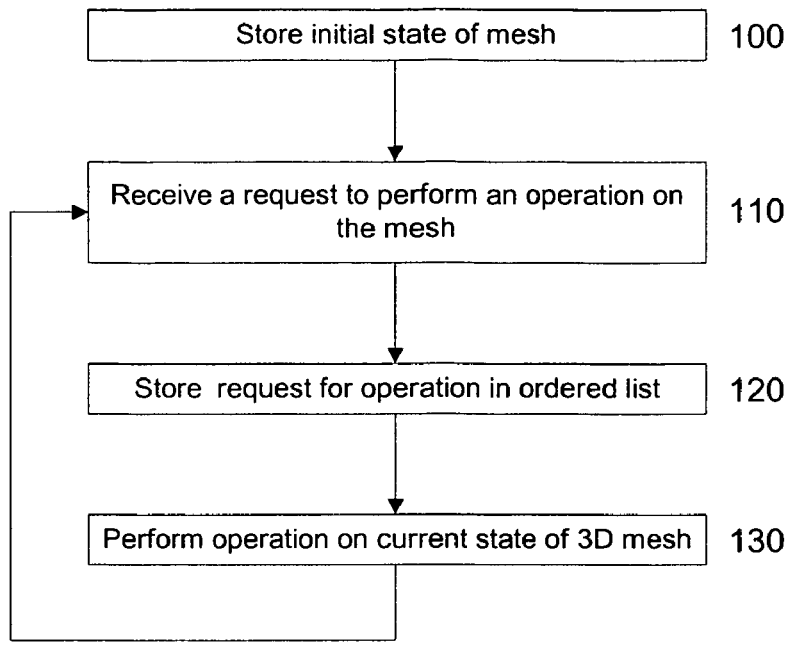
FIG. 1 illustrates one example embodiment of the present invention for storing a 3D mesh during the editing process.

One embodiment of the present invention reduces the amount of memory that is required to maintain a record of prior versions of the 3D mesh as the editing process progresses. This record is typically used to allow the user the option of "undoing" any operations that have been performed that the user later decides are undesirable. However, storing a copy of the mesh after each editing operation is performed would quickly consume a large amount of memory especially if the mesh is sufficiently complex. In accordance with an example embodiment of the present invention as illustrated in FIG. 1, an initial copy of the mesh is stored in memory and is not altered by subsequent editing operations (Step 100). Instead, a working copy of the 3D mesh is maintained that is used to render the 3D mesh to the screen or display device. When a request to perform an editing operation is received (e.g. a user executes a command on the computer) (Step 110), a record of the operation and any appropriate parameters required for the operation (e.g., variable values) is stored in an ordered list (Step 120). The editing operation is then applied to the working copy of the mesh (Step 130). The ordered list provides a complete record of every operation that has been performed on the initial copy of the mesh in order to arrive at the current working copy of the mesh.

This ordered list allows the user to "undo" any number of operations that have been performed on the mesh. For example, the working copy of the mesh may be rebuilt by performing each operation in the list in order on the initial copy of mesh until the desired "level" of undo is reached. If a user chooses to undo the last three (3) operations that were performed on the mesh and the mesh has had fifteen operations performed on it since the initial copy was made (i.e. the list currently has fifteen (15) records in it), then the operations of the first twelve (12) records may be performed on the initial copy of the mesh (i.e. 15−3=12) to reach the desired level of undo. Alternatively, depending on the nature of the operation(s) to be undone, it may be possible to simply perform the reverse of the operation(s) stored in the list to reach the desired level of undo. As in the previous example, when the user wants to undo the last three operations, if the operations are reversible, the three operations can simply be performed in reverse fashion on the working copy of the mesh to reach the desired level of undo. Which of these methods is the most efficient way of performing the undo may be determined based on the complexity or the total number of operations necessary to perform the undo. Additionally, it is also possible to undo one or more operations in the middle of the ordered list without undoing the operations performed after them, simply by removing their records from the list and performing the remaining operations on the initial copy of the mesh. However, the resulting mesh may be unpredictable in appearance.

Furthermore, this embodiment of the present invention allows an animated display of the editing operations that have been performed on the mesh. Using the ordered list, the animated display can be prepared by recreating the working copy of the mesh, one operation at a time from the initial copy of the mesh and displaying the results after each operation on the screen.

When the mesh is saved to a hard disk or other medium for later retrieval, it can be saved as just the working copy of the mesh so that when the mesh is retrieved for later editing, the saved copy becomes the new initial copy of the mesh and a new ordered list is created as operations are performed on it. Alternatively, the mesh can be saved as the initial copy and the ordered list so that when the mesh is retrieved the initial copy is the same as in the previous editing session and the user has the option of undoing operations that were performed in the previous session.

The present invention is not limited to having only an initial copy of the mesh and one working copy of the mesh stored in memory. It may also be implemented with the several working copies kept in memory, reflecting the state of the mesh after the last few operations, thus allowing undo's of only one, two, or three levels, for example, to be performed more rapidly.

Figure 2:
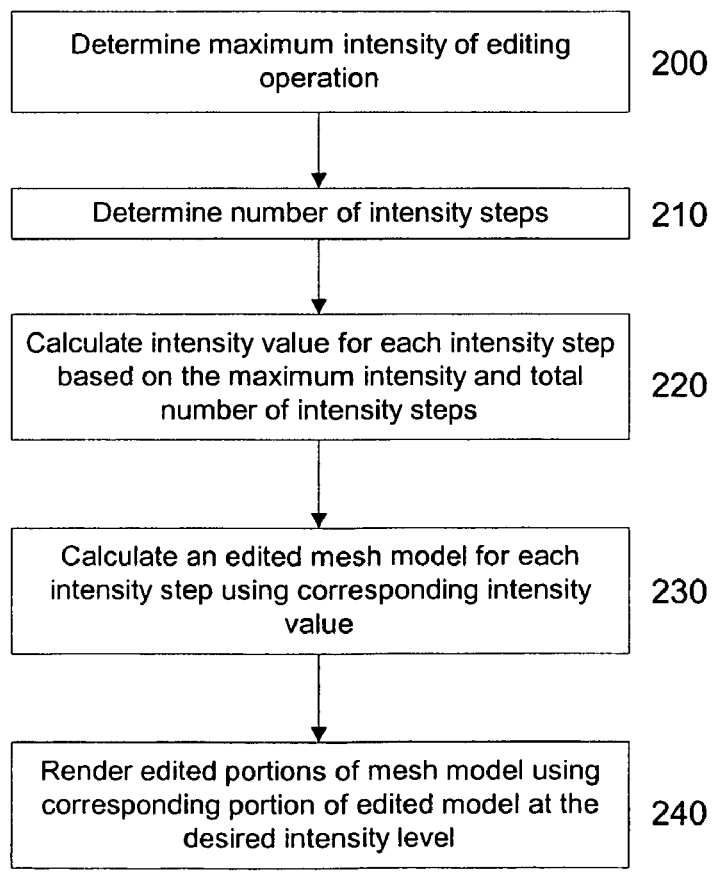
FIG. 2 illustrates one example embodiment of the present invention for reducing the amount of real time calculations required for rendering an edited 3D mesh.

Another embodiment of the present invention maintains several versions of the 3D mesh in memory in order to reduce the amount of real time calculation required when the edited mesh is rendered. As shown in FIG. 2, when an editing operation is anticipated, a maximum potential strength for the editing operation is determined (Step 200). An editing operation can be anticipated, for example, by the user selecting a tool icon from a toolbar or an item on a menu, or by software that predicts that an editing operation will be performed based on past user behavior.

The "strength" of an editing operation corresponds to the degree to which the operation effects the 3D mesh. For example, a smoothing tool can smooth the surface of the 3D mesh by a larger or smaller amount depending on the parameters input to the operation. The maximum potential strength for an editing operation can be determined, for example, based on a selection or preference previously indicated by the user, a limitation of the operation to be performed (e.g., a strength value that results in a divide by zero error), or a realistic maximum beyond which the strength of the operation would defeat the intended purpose (e.g., a strength value for a smoothing operation that results in a mesh that is a flat plane).

The number of strength levels (i.e. the number of different versions of the edited mesh to be created) is then determined (Step 210). This number can be determined, for example, based on a user selection or preference, a default value, or practical limitations due to the complexity of the operation and/or the memory size of the mesh. A strength value for each strength level is then calculated based on the maximum potential strength and the number of strength levels (Step 220). Alternatively, a strength increment (i.e., the difference in strength between each strength level) can be determined. The number of necessary strength levels can then be calculated based on the strength increment and the maximum potential strength. A further alternative is to determine a strength increment and number of strength levels and calculate the maximum potential strength based on those values.

A copy of the current state of the mesh model is then created for each of the strength levels and the editing operation is applied to the each copy of the mesh at the appropriate strength for each strength level (Step 230). These precalculated meshes are maintained in memory until the editing operation is actually requested (e.g., the user clicks the mouse on a portion of the mesh) or circumstances change such that the operation is no longer anticipated (e.g., the user selects a different menu item). When the operation is requested, the mesh precalculated at the strength value most closely corresponding to the strength value of the operation request is selected from the precalculated meshes. If the editing operation is requested to be performed on the entire mesh, the selected precalculated mesh replaces the existing current state of the 3D mesh. If the editing operation is requested to be performed only on a portion of the mesh, the vertices corresponding to that portion are extracted from the selected precalculated mesh and inserted into the current state of the mesh (Step 240). The "new" current state of the 3D mesh is then rendered to the screen or display device. Thus, the present invention allows the edited mesh to be rendered to the screen much more quickly because the editing calculations have been completed before the editing operation was requested and only the selection of the appropriate edited mesh or portion thereof is necessary after the operation is requested.

Figure 9A:
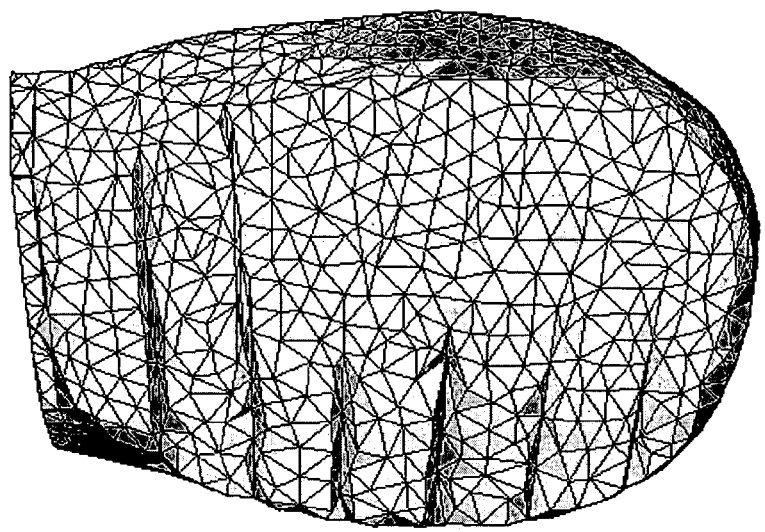
FIGS. 9a to 9c illustrate examples of a mesh used by one example embodiment of the present invention for reducing the amount of real time calculations required for rendering an edited 3D mesh.
Figure 9B:
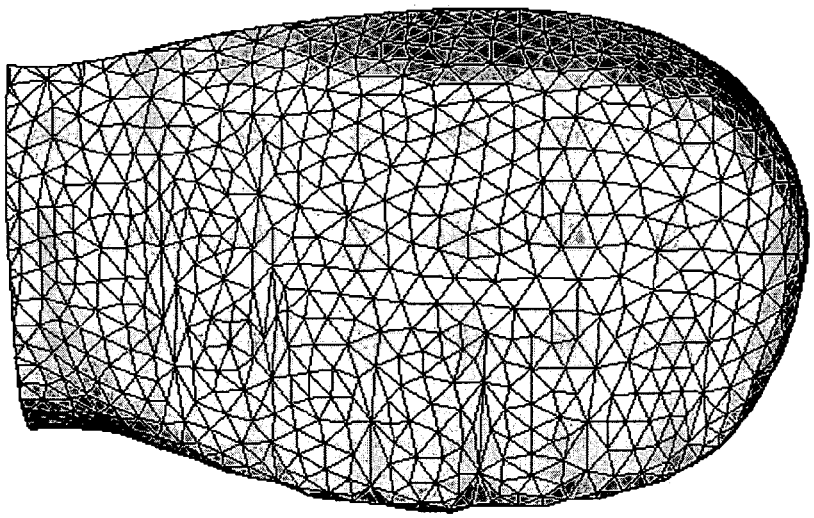
Figure 9C:
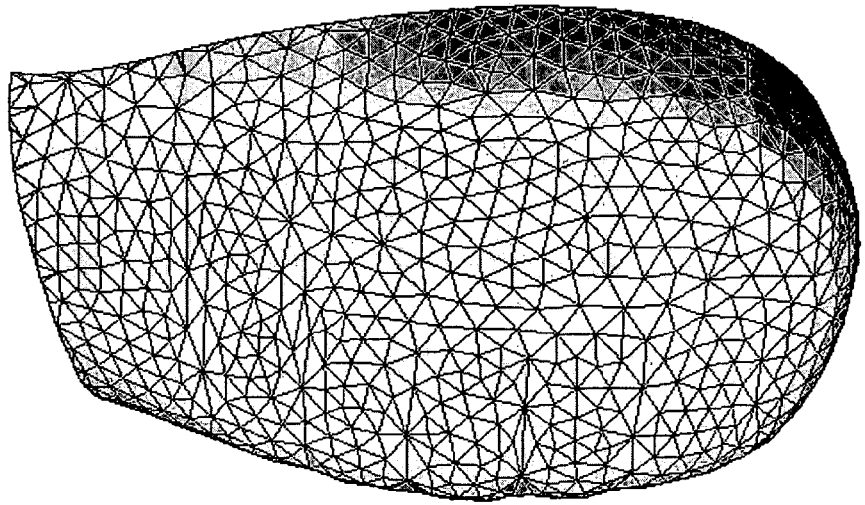

For example, a smoothing operation request is anticipated on a 3D mesh that consists of a flat surface with a single bump in the middle. The maximum strength level of the smoothing operation is determined to be that value at which the mesh will be completely flat. Based on a user preference, the number of strength levels is determined to be ten. These two values are then used to determine the strength value of each strength level. One copy of the 3D mesh is created for each of the strength levels and the smoothing operation is applied to each of these copies at the appropriate strength value. The resulting ten copies of the 3D mesh start with the mesh at the first strength level that is slightly smoother than the existing state of the 3D mesh and progress gradually to the mesh at the tenth strength level that is a completely flat surface. An example of 3 copies of a mesh at different strength levels is shown in FIGS. 9a, 9b, and 9c. When the user actually requests the smoothing operation, the strength requested is closest to the fourth strength level. The copy of the mesh that corresponds to the fourth strength level is then selected. This selected mesh is then used to replace the existing mesh, or, if only part of the existing mesh was selected to have the operation performed on it, those vertices within the selected portion are replaced by the corresponding vertices from the selected mesh.

Figure 3:
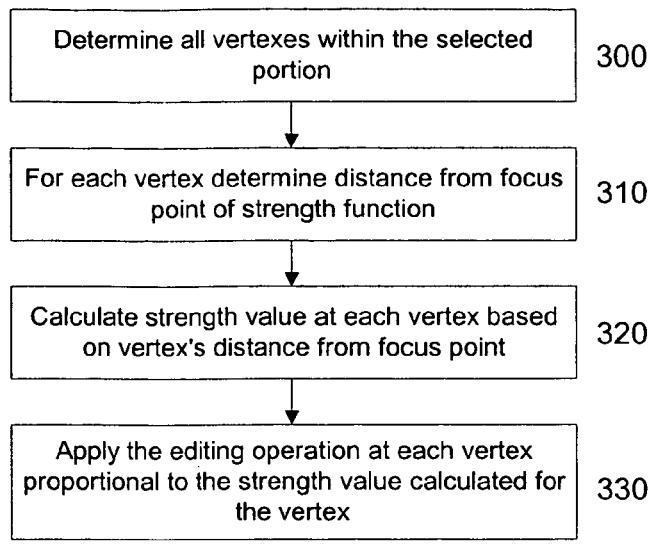
FIG. 3 illustrates one example embodiment of the present invention which blends a modifying operation into unaltered areas of the 3D mesh using a strength function.

Another embodiment of the present invention allows an editing operation requested on a portion of the mesh to be smoothly blended into the surrounding unaltered area by applying a strength function to the editing operation. As shown in FIG. 3, the vertices within the selected portion of the mesh are determined (Step 300). For each vertex, the distance from the focus point of the strength function, frequently but not necessarily the center of the selected portion, to the vertex is measured (Step 310). The strength value at each vertex is then calculated based on the measured distance from the focus point (Step 320). The editing operation is then applied at each vertex proportionately based on the strength value calculated for the vertex (Step 330). The strength function is generally a decay function such that the strength of the editing operation is greatest when the distance from the focus point is zero and the strength diminishes to zero at the edge of the selected portion. This is accomplished most easily when the selected portion is circular, and the strength function is a traditional decay function such as linear, exponential, or logarithmic. However, one of skill in the art can implement this embodiment of the present invention with a broad variety of selection shapes and strength functions.

For example, a smoothing operation is performed on a portion of a 3D mesh using a strength function that is a based on a linear decay function with a value of one at the center of the selection and a value of zero on the perimeter. The distance from the center of the selected portion to each vertex within the selected portion is measured and a strength value for each vertex is determined. All vertices outside the selected portion are assigned a strength of zero. The smoothing operation is then applied to each vertex at the strength that was determined for that vertex. After the smoothing operation has been performed on each vertex, the selected portion of the resulting mesh has been smoothed but still blends into the unedited areas.

Figure 4:
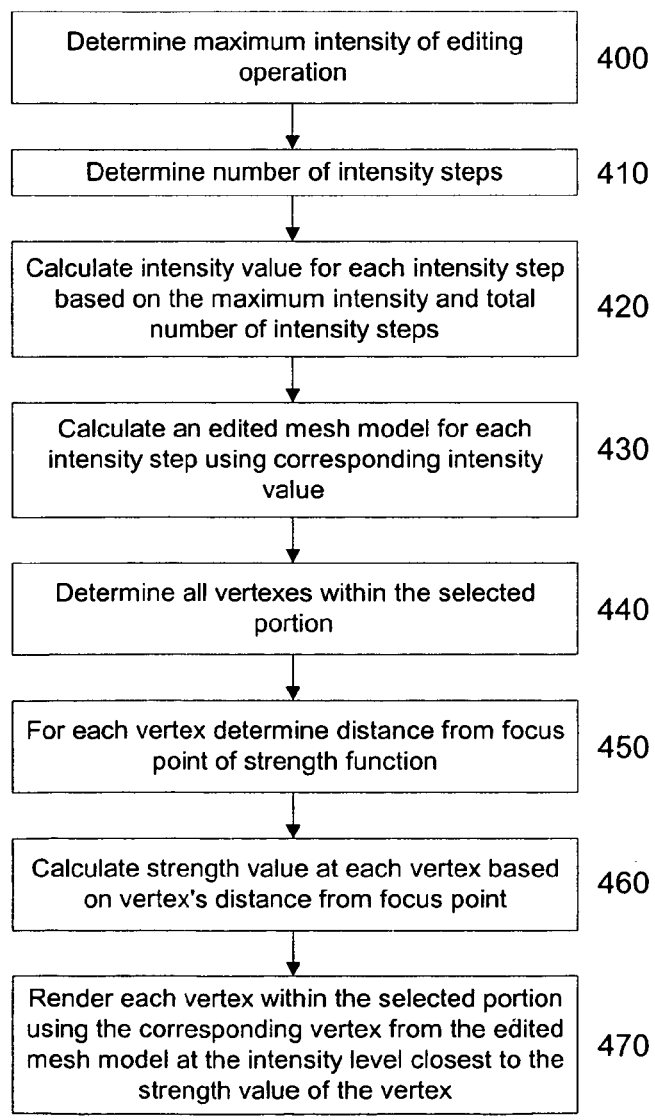
FIG. 4 illustrates an alternative embodiment of the present invention which blends a modifying operation into unaltered areas of the 3D mesh using a strength function with reduced real time calculation.

This embodiment may also be combined with the aforementioned embodiment for reducing real time computation as shown in FIG. 4. As described above, the maximum potential strength of the editing operation and the number of strength levels are determined when an editing operation is anticipated (Step 400, 410). A strength value is then calculated for each strength level based on the maximum potential strength and the number of strength levels (Step 420). A copy of the current state of the mesh model is then created for each of the strength levels and the editing operation is applied to the entire copy of the mesh at the appropriate strength for each strength level (Step 430). The vertices within the selected portion of the mesh are determined (Step 440) and the distance from each vertex to the focus point of the strength function is measured (Step 450). A strength value for each vertex in the selected portion is then calculated (Step 460). When the editing operation is requested, each vertex within the selected portion is replaced with the corresponding vertex from the precalculated mesh with the strength value closest to the strength value calculated for the vertex within the selected portion (Step 470). This mesh with the replaced vertices becomes the new current state of the mesh and is used to render the screen display.

Figure 10:
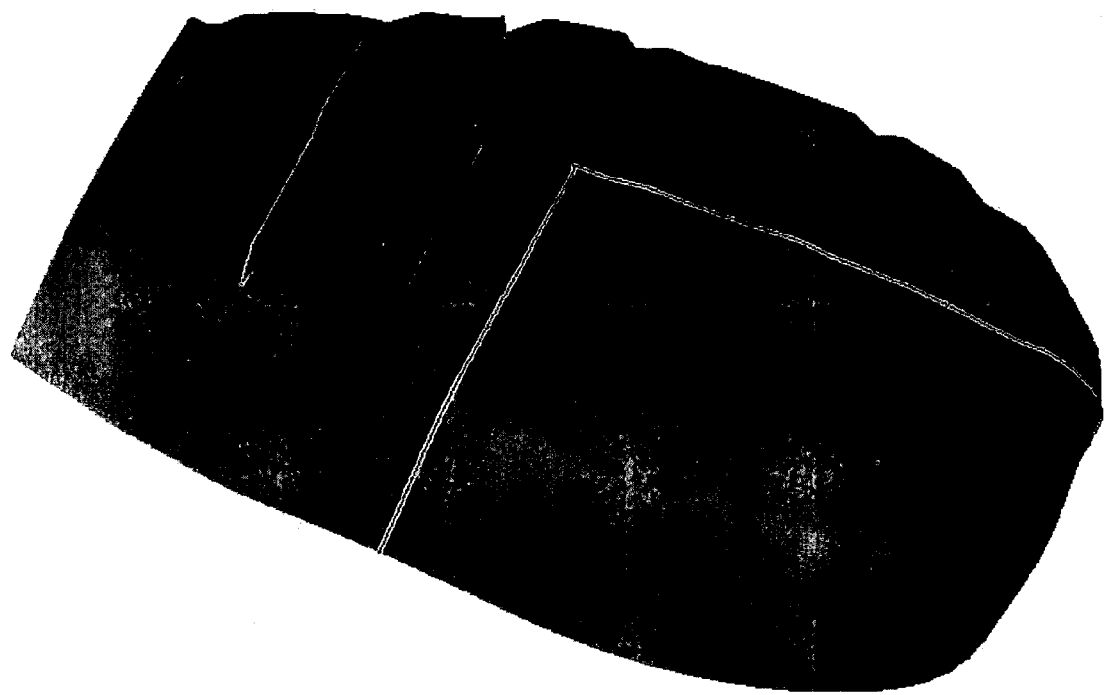
FIG. 10 illustrates an example of a mesh modified using an alternative embodiment of the present invention which blends a modifying operation into unaltered areas of the 3D mesh using a strength function with reduced real time calculation.

For example, as in the prior example for precalculating the edited mesh, a smoothing operation request is anticipated on a 3D mesh that consists of a flat surface with a single bump in the middle. The maximum strength level of the smoothing operation is determined to be that value at which the mesh will be completely flat. Based on a user preference, the number of strength levels is determined to be ten. These two values are then used to determine the strength value of each strength level. One copy of the 3D mesh is created for each of the strength levels and the smoothing operation is applied to each of these copies at the appropriate strength value. The resulting ten copies of the 3D mesh start with the mesh at the first strength level that is slightly smoother than the existing state of the 3D mesh and progress gradually to the mesh at the tenth strength level that is a completely flat surface. A smoothing operation is then requested using a strength function that is a based on a linear decay function with a value at the center of the selection equal to the value of the tenth strength level and a value of zero on the perimeter. The distance from the center of the selected portion to each vertex within the selected portion is measured and a strength value for each vertex is determined. All vertices outside the selected portion are assigned a strength of zero. For each vertex, the corresponding vertex in the mesh that has a strength value closest to that determined for the vertex is selected and used to replace the vertex. After this process has been repeated for each vertex within the selected area, resulting mesh with the vertices replaced, will have a smoothed selected portion that still blends into the unedited areas and all of the smoothing calculations were performed in advance with only the selecting and replacing operations performed after the smoothing operation was requested. An example of a mesh that has had a portion smoothed by this technique is illustrated in FIG. 10.

In any of the aforementioned methods where the mesh or a portion thereof has been precalculated, if the strength level of the editing operation that is actually performed does not precisely match any of the precalculated copies of the mesh, the copy most closely matching the actual operation can be used to render the screen display immediately. The editing operation at the precise strength level desired can then be performed in the background and the screen display updated when it is completed.

Figure 5:
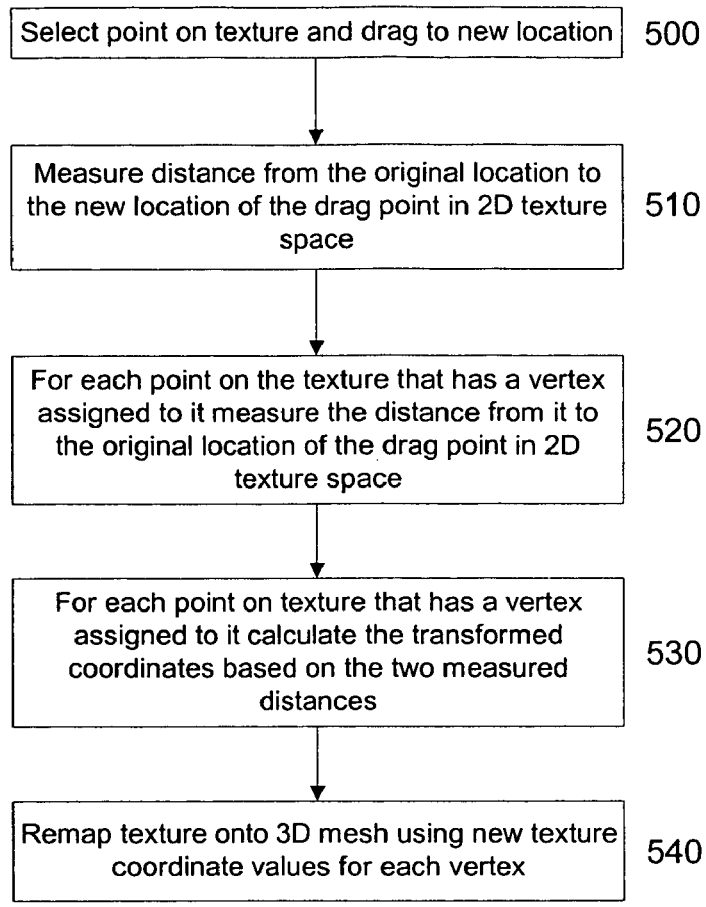
FIG. 5 illustrates one example embodiment of the present invention which adjusts the way a texture is mapped onto a 3D mesh.

Another embodiment of the present invention provides a method for adjusting the way in which textures are mapped onto the mesh. When a texture is mapped onto a mesh, its position on the mesh may be established by assigning a point on the texture to each vertex in the mesh that the texture touches. In this way, the texture is fitted onto the mesh and as the vertices in the mesh are moved by later editing operations the texture is stretched and compressed in order to still cover the same vertices. The present invention includes an embodiment that eases the process of adjusting the texture on the mesh in order to improve the overall appearance. As shown in FIG. 5, a point on a texture that has been mapped onto a mesh is selected by the user and moved to a new location, for example by clicking on it with the mouse and dragging it to a new location on the mesh (Step 500). The distance from the original location of the drag point to the new location of the drag point is measured in two dimensional (2D) texture space (Step 510). Measuring in 2D texture space measures the movement of the drag point only in regard to the 2D planar space of the texture and ignores any 3D component that is due to the way the texture has been mapped onto the mesh. The distance between each point in the texture that is assigned to a vertex and the original location of the drag point is then measured in 2D texture space (Step 520). Transformed coordinates are then calculated for each point in the texture based on the two measured distances (Step 530). In order to prevent an undue amount of distortion to the texture while still ensuring that the drag point is smoothly transformed to its intended new location, a weight function based on the distance of the assigned vertex point to the original location of the drag point is used. (i.e., C'=C+ (d)f(r) where C is the coordinates of the point assigned to a vertex, d is the drag distance, r is the distance from the assigned point to the original drag point location, and f( ) is a weight function). After transformed coordinates are calculated for each point assigned to a vertex, the texture is remapped onto the mesh using the transformed coordinates (Step 540).

Figure 6:
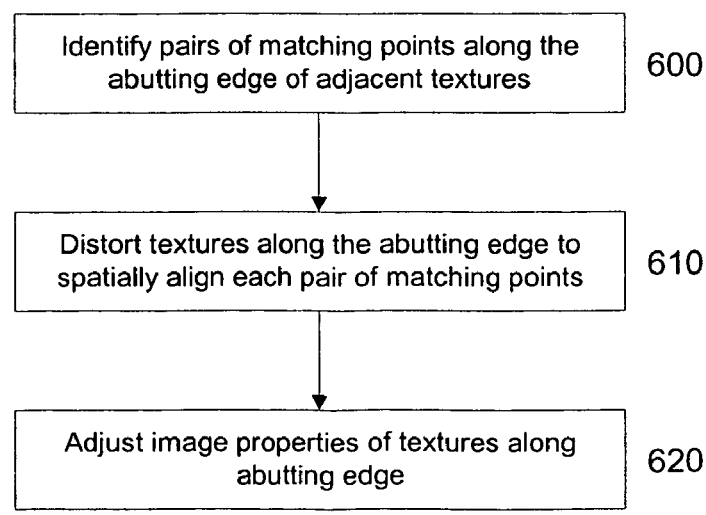
FIG. 6 illustrates one example embodiment of the present invention which blends abutting textures to improve 3D mesh appearance.

Frequently when two textures are mapped onto a mesh adjacent to one another, the abutting edges of the textures do not match, even if the textures were originally taken from the same object or photograph. The present invention provides an embodiment that allows abutting textures that have been mapped onto a mesh to be modified to provide a blended appearance and improve the overall appearance of the mesh. As shown in FIG. 6, pairs of matching points (i.e. one point of each pair in each texture) are identified along the abutting edge of the textures (Step 600). This identification can be accomplished using an algorithm, such as one of those developed by the Sarnoff Corporation, or the points can be identified manually by the user. There can be as few as one pair of points selected but the results improve the more pairs that are selected. The results also improve if the pairs are spread out along the edge rather than being clustered in one area. The textures are then distorted (e.g., stretched or compressed) along the abutting edge in order to spatially align each pair of matching points (Step 610). This spatial distortion may occur in both textures equally, in both textures unequally, or in only one of the textures, depending on the initial size of the textures and/or amount of distortion required to align a pair of matching points. The spatial distortion may be smoothly propagated through the entire texture to maintain the position of the other edges of the texture by applying a technique similar to that employed in regard to remapping a texture as described above. After the textures have been distorted, the image properties of the abutting textures are analyzed and adjusted to provide a more blended appearance (Step 620). This adjustment may involve, for example, adjusting the color or intensity of one or both of the textures to provide a closer match between them. These adjustments may also be smoothly blended through the texture to avoid altering the image properties at the other edges of the textures.

Figure 7:
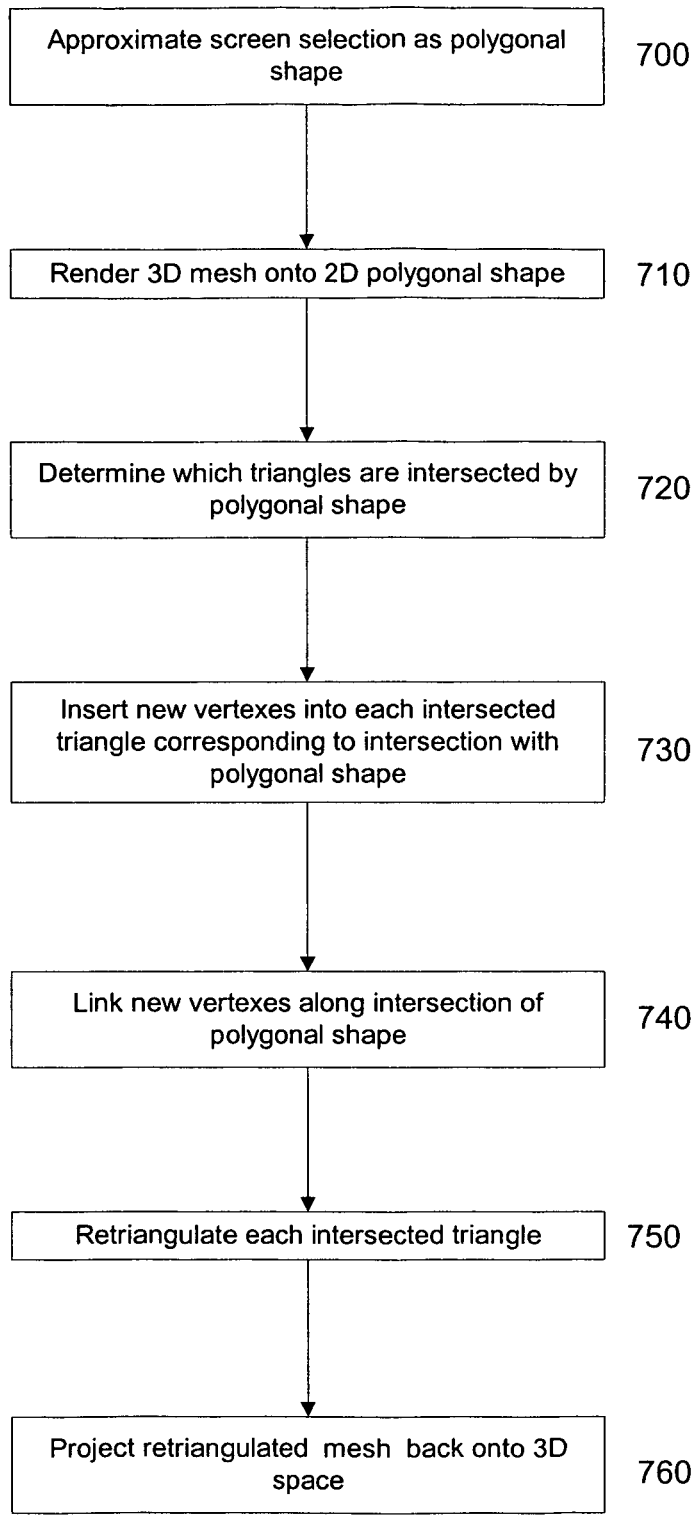
FIG. 7 illustrates one example embodiment of the present invention which translates a freeform screen selection into an accurate face selection on the 3D mesh.
Figure 8A:
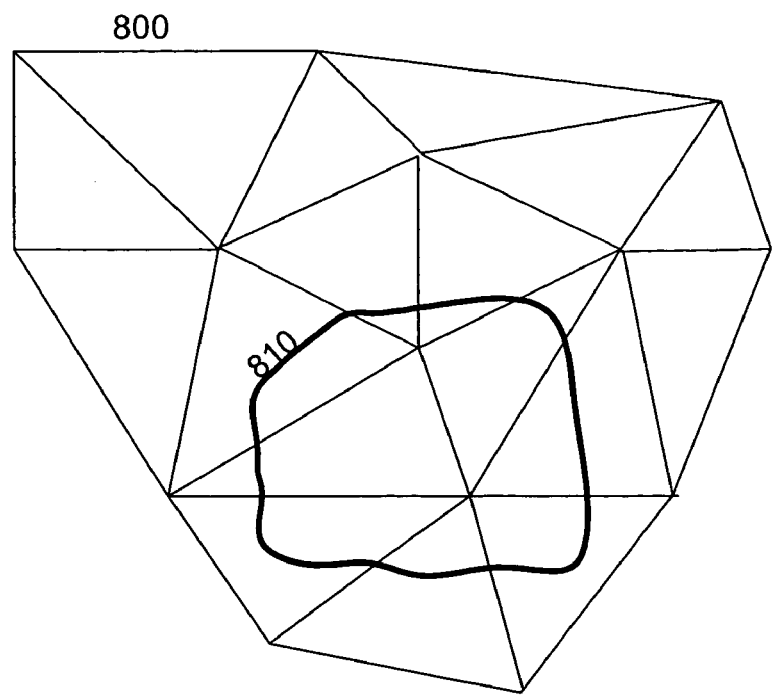
FIGS. 8a to 8d illustrate an example of a 3D mesh upon which the present invention translates a freeform screen selection into an accurate face selection is being performed.
Figure 8B:
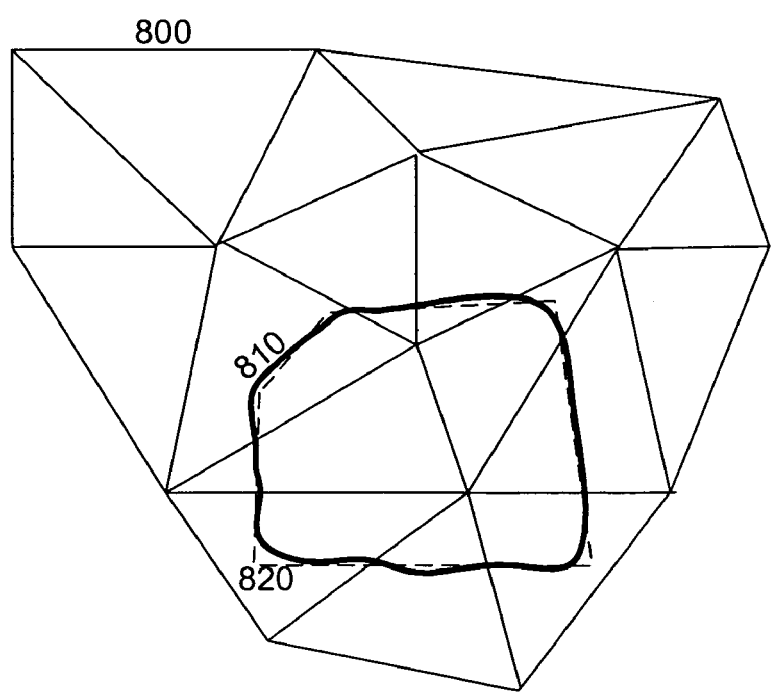
Figure 8C:
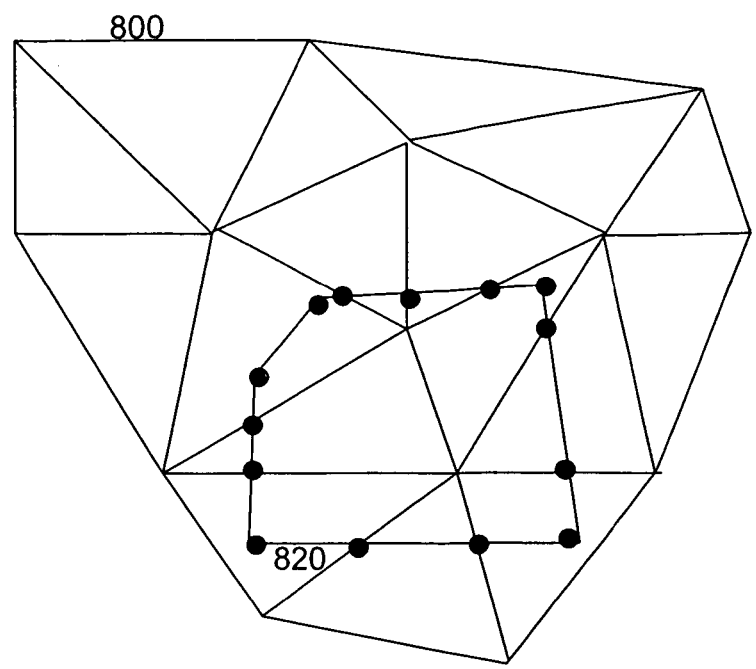
Figure 8D:
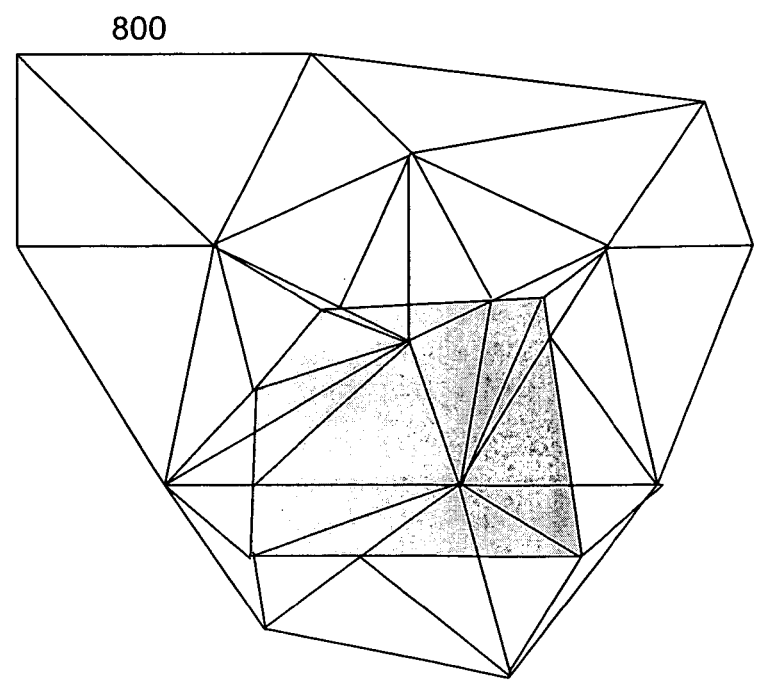

Another embodiment of the present invention provides a method for precisely selecting portions of a mesh even when the portion to be selected does not follow existing faces or vertices. For example, as shown in FIG. 8a, a user may select an area 810 on the screen that does not correspond to the vertices or faces of mesh 800. The method of the present invention, as shown in FIG. 7, approximates the screen selection as a polygonal shape (Step 700). Any appropriate method for approximating a freeform shape as a polygon is acceptable for this process. The mesh is then projected into 2D space onto the polygonal shape (Step 710). In FIG. 8b, polygon 820 is shown approximating the shape of selection area 810 and mesh 800 has been projected into 2D space. The method of the present invention then determines which triangles are intersected by the polygonal shape (Step 720) and new vertices are inserted into the mesh corresponding to the intersection with the polygonal shape (Step 730). The new vertices are then linked along the intersection of the polygonal shape (Step 740). FIG. 8c shows the vertices and links that have been added to mesh 800 corresponding to the intersection of polygon 820. Each intersected triangle in the mesh is then retriangulated to integrate the new vertices and links into the mesh (Step 750) as shown in FIG. 8d. This retriangulation process may employ any appropriate method of triangulation such as Delaney triangulation. The retriangulated mesh is projected back into 3D space (Step 760). Thus the screen selection can be precisely selected because the selection now follows vertices and links within the mesh.

This embodiment of the present invention can also be adapted for use with other tools that would benefit from more precise application to the mesh than is possible using the existing vertices and links, such as a tool for slicing a mesh along a plane. For example, where the plane intersects a triangle in the mesh, new vertices and links are inserted into the intersected triangles. The triangles are retriangulated to integrate the new vertices and links, and the result allows a more accurate division of the mesh along the desired plane.

The present invention is not limited to the specific embodiments described. Further combinations of the described embodiments are possible. It is also expected that those skilled in the art will be able to devise other implementations that embody the principles of the present invention and remain within its scope.

What is claimed is:

1. A method for managing a three dimensional mesh model on a computer system, comprising:
    storing a copy of a first state of the three dimensional mesh model on the computer system;
    performing operations on the three dimensional mesh model, wherein the three dimensional mesh model is in a second state after performing the operations;
    storing a record of each of the operations in an ordered list on the computer system; and
    reapplying at least some of the operations stored in the ordered list to the stored first state of the three dimensional mesh model, wherein the three dimensional mesh model is in a third state after reapplying the at least some of the operations.

2. The method of claim 1 wherein the step of storing a record of each of the operations includes:
    storing all of the parameters necessary to repeat the operations.

3. The method of claim 2 wherein the ordered list contains a record for each operation that has been previously performed on the three dimensional mesh model in the order in which it was performed.

4. The method of claim 1 wherein the step of reapplying at least some of the operations stored in the ordered list to the stored first state of the three dimensional mesh model includes:
- retrieving the stored copy of the first state of the three dimensional mesh model;
- retrieving the ordered list of operations; and
- performing at least one operation in the ordered list of operations on the retrieved copy of the first state of the three dimensional mesh model.

5. A method for restoring a previous version of a three dimensional mesh model on a computer system comprising:
- retrieving a stored copy of an earlier state of the three dimensional mesh model on the computer system;
- retrieving an ordered list of operations on the computer system; and
- performing at least some of the operations in the ordered list of operations on the retrieved copy of the three dimensional mesh model;
- wherein the ordered list of operations contains the operations which if performed in order on the earlier state of the three dimensional mesh model would result in a current state of the three dimensional mesh model.

6. The method of claim 5 wherein each operation is performed in the same order in which it was originally placed in the ordered list.

7. The method of claim 6 further comprising the step of:
- rendering the retrieved copy of the three dimensional mesh model to a display device after each operation is performed.

8. The method of claim 6 wherein the ordered list of operations is filtered to exclude at least one record.

9. The method of claim 8 wherein the at least one excluded record is at an end of the list.

10. The method of claim 8 wherein the at least one excluded record is at least one record removed from an end of the list.

11. An article of manufacture comprising a computer-readable medium having stored thereon instructions adapted to be executed by a processor, the instructions which, when executed, define a series of steps to be used for managing a three dimensional mesh model, said steps comprising:
- storing a copy of a first state of the three dimensional mesh model;
- performing operations on the three dimensional mesh model, wherein the three dimensional mesh model is in a second state after performing the operations;
- storing a record of each of the operations in an ordered list; and
- reapplying at least some of the operations stored in the ordered list to the stored first state of the three dimensional mesh model, wherein the three dimensional mesh model is in a third state after reapplying the at least some of the operations.

12. The article of manufacture of claim 11 wherein the step of storing a record of each of the operations includes:
- storing all of the parameters necessary to repeat the operations.

13. The article of manufacture of claim 12 wherein the ordered list contains a record for each operation that has been previously performed on the three dimensional mesh model in the order in which it was performed.

14. The article of manufacture of claim 11 wherein the step of reconstructing the three dimensional model includes:
- retrieving the stored copy of the first state the three dimensional mesh model;
- retrieving the ordered list of operations; and
- performing at least one operation in the ordered list of operations on the retrieved copy of the first state of the three dimensional mesh model.

15. An article of manufacture comprising a computer-readable medium having stored thereon instructions adapted to be executed by a processor, the instructions which, when executed, define a series of steps to be used for restoring a previous version of a three dimensional mesh model, said steps comprising:
- retrieving a stored copy of an earlier state of the three dimensional mesh model;
- retrieving an ordered list of operations; and
- performing at least some of the operations in the ordered list of operations on the retrieved copy of the three dimensional mesh model;
- wherein the ordered list of operations contains the operations which if performed in order on the earlier state of the three dimensional mesh model would result in a current state of the three dimensional mesh model.

16. The article of manufacture of claim 15 wherein each operation is performed in the same order in which it was originally placed in the ordered list.

17. The article of manufacture of claim 16 further comprising the step of:
- rendering the retrieved copy of the three dimensional mesh model to a display device after each operation is performed.

18. The article of manufacture of claim 16 wherein the ordered list of operations is filtered to exclude at least one record.

19. The article of manufacture of claim 18 wherein the at least one excluded record is at an end of the list.

20. The article of manufacture of claim 18 wherein the at least one excluded record is at least one record removed from an end of the list.

21. A system for managing a three dimensional mesh model, the system comprising:
- a computer module that stores a copy of a first state of the three dimensional mesh model;
- a computer module that performs operations on the three dimensional mesh model, wherein the three dimensional mesh model is in a second state after performing the operations;
- a computer module that stores a record of each of the operations in an ordered list; and
- a computer module that reapplies at least some of the operations stored in the ordered list to the stored first state of the three dimensional mesh model, wherein the three dimensional mesh model is in a third state after reapplying the at least some of the operations.

22. The system of claim 21 wherein the a computer module for storing a record of each of the operations includes:
- a computer module that stores all of the parameters necessary to repeat the operation.

* * * * *